No. 850,632. PATENTED APR. 16, 1907.
A. T. EKLUND.
SCISSORS.
APPLICATION FILED AUG. 25, 1906.
Fig. 1.
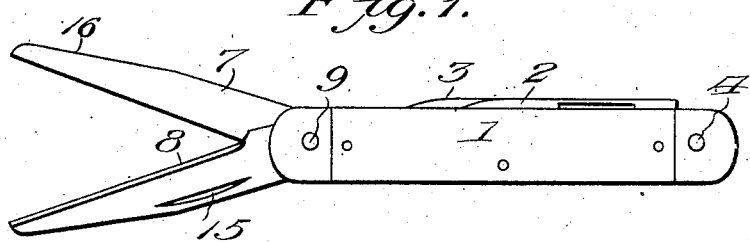
Fig. 2.
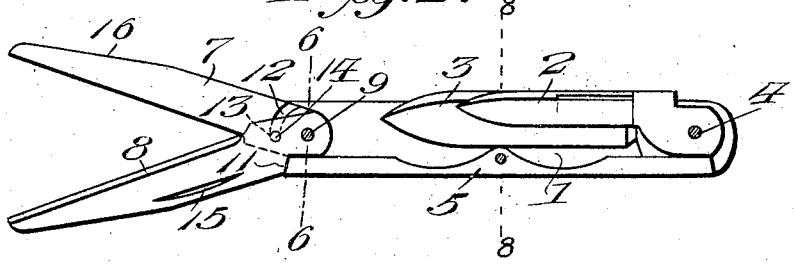
Fig. 6. Fig. 3.
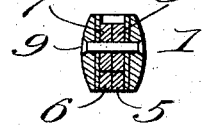 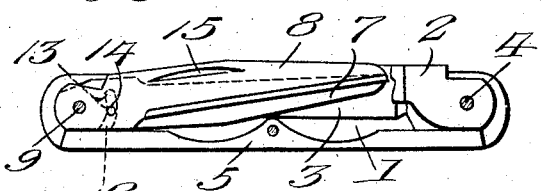
Fig. 7.
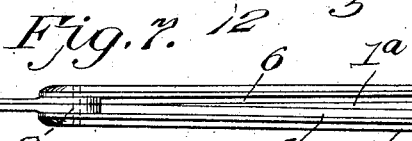
Fig. 4. Fig. 5.
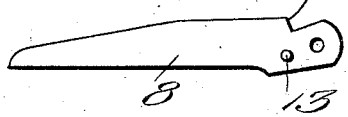 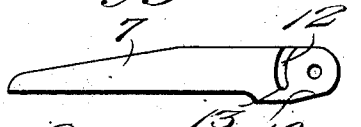
Fig. 8.
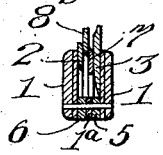
Witnesses
Edwin F. McKee
C. C. Hines.
Inventor
Albert T. Eklund
By Victor J. Evans
Attorney

UNITED STATES PATENT OFFICE.

ALBERT T. EKLUND, OF JAMESTOWN, NEW YORK.

SCISSORS.

No. 850,632.     Specification of Letters Patent.     Patented April 16, 1907.

Application filed August 25, 1906. Serial No. 332,034.

*To all whom it may concern:*

Be it known that I, ALBERT T. EKLUND, a citizen of the United States of America, residing at Jamestown, in the county of Chautauqua and State of New York, have invented new and useful Improvements in Scissors, of which the following is a specification.

This invention relates to improvements in scissors, and particularly to a scissors attachment for pocket-knives, the object of the invention being to provide a knife into the handle of which the scissors-blades are adapted to close, the springs of the knife acting on the knife-blades being utilized to hold the scissors-blades normally closed as well as to assist in the manipulation of such blades in their cutting operation.

A further object is to provide a construction by which the blades may be operated by direct hand manipulation or by manipulating the knife-handle, and by which the blades may be opened simultaneously.

In the accompanying drawings, Figure 1 is a side elevation, showing the scissors-blades swung out for use. Fig. 2 is a longitudinal section through the handle with the blades in the same position. Fig. 3 is a similar view showing the blades folded. Figs. 4 and 5 are detail views of the blades. Fig. 6 is a cross-section on line 6 6 of Fig. 2. Fig. 7 is a front view of the device, showing the blades swung out to open position. Fig. 8 is a cross-section on line 8 8 of Fig. 2.

Referring to the drawings, the numeral 1 designates the handle of a pocket-knife of ordinary construction, into which are adapted to fold knife-blades 2 and 3, pivotally mounted at one end of the handle on a cross-pin 4, the butts of the blades being adapted to engage the ordinary back-springs 5 and 6 to hold said blades in open or extended position.

Arranged at the opposite end of the handle are the scissors-blades 7 and 8, which are pivotally mounted at their inner ends on a cross-pin 9. The butts of these blades are adapted to engage the springs 5 and 6 by the action of which the blades are held when open in operative position, while permitting of their relative movement. The blade 7 is formed with a shoulder 10 to bear against the spring 6, while the blade 8 is formed with a shoulder 11 to similarly engage and coact with the spring 5. On the inner face of the blade 7, adjacent to and concentric with the pivot 9, is formed a groove 12, opening through said back edge of the blade and terminating at its inner end in a shoulder 13, the blade 8 being provided with a lug or pin 14 to ride in said groove and coact with said shoulder for the purpose hereinafter described. The blades have a sufficient range of movement to permit them to be forced to pass each other to expose the edges thereof so that they may be conveniently sharpened by the use of a file or grindstone.

The blades 7 and 8 are adapted to swing into the handle 1 and fold between the knife-blades 2 and 3, and the blade 8 is provided with a nail-recess 15, into which the nail of the thumb of one of the fingers of the hand may be inserted to adapt said blade to swing outwardly. The groove 12 permits relative movement of the blades in the operation of cutting, as the lug or pin 14 will simply play therein. The pin, however, is adapted to engage the shoulder 13, so that when the blade 8 is swung outwardly motion will be communicated to the blade 7 to simultaneously swing outwardly therewith.

In order to provide for the folding of all the blades within an ordinary two-bladed handle, a division-plate 1ª is arranged between the springs 5 and 6, the plate being thickest at the rear end where it is connected with the side plates of the handle by the pin 4, and thence gradually tapering toward the forward end of the handle, at which the scissors-blades 7 and 8 are situated. By this arrangement spaces are formed on opposite sides of the division-plate, into which the knife-blades 2 and 3 may fold, leaving an intervening space on the line of the division-plate into which the scissors-blades fold, thus allowing the scissors-blades to fold into the handle to clear the knife-blades. The tapering form or gradually-diminishing width of the blades from their pivoted ends provides for the ready unfolding of the blades at the points where the free ends of one set of blades lie in their folded position between the pivoted ends of the other set of blades. The construction described is clearly illustrated in Figs. 7 and 8.

Figs. 1 and 2 show the blades 7 and 8 in operative position, from which it will be understood that they are held in such position by the springs 5 and 6, so that by holding the handle 1 in the hand and using the thumb and one or more fingers to exert pressure on the blades the latter may be forced together for the cutting operation, the springs serving to retract them. The blade 7 is provided with a beveled or inclined bearing-surface 16 on its back edge to enable it to be slid over the surface of a desk, table, or other similar article to effect an automatic operation of the blades. This is attained by grasping the handle 1 in the hand, resting the surface 16 of the blade 7 by the inversion of the knife from the position shown in Figs. 1 and 2, and sliding the device forward while alternately depressing and releasing the handle 1. Upon the depression of the handle the blade 7 will be forced against the resistance of its spring toward the blade 8, whereby a relative cutting motion of said blades is obtained, and then upon relaxing the handle or moving it upwardly the spring 6 will return the blade to normal position. Hence by laying a piece of cloth or paper over the surface of the table and operating the device in the manner described, such material may be readily cut in a convenient manner. In this operation it will be understood that the spring 5 holds the blade 8 from upward movement, while the spring 6 exerts resistance on the downward pressure of the handle to the movement of the blade 7 and upon cessation of such pressure restores the blade to normal position.

The invention thus provides a scissors construction which forms a convenient adjunct to an ordinary pocket-knife; but it will of course be understood that the knife-blades may be omitted and the form of handle shown employed to secure the production of a pair of scissors in which the blades are adapted to operate in the manner described to fold into the handle to permit of the device being readily stored or carried in the pocket.

Having thus described the invention, what is claimed as new is—

1. Scissors or shears comprising a handle, shear-blades pivotally mounted on the handle and adapted to fold therein, springs acting on the blades to hold them in folded or closed position, said springs being adapted to permit relative movement of the blades for a cutting action, and a connection between the blades, whereby they are adapted to be simultaneously opened by a pulling action upon one of the blades, said connection permitting free relative movement of said blades in the cutting action.

2. Scissors or shears comprising a handle, shear-blades coaxially mounted upon a common pivot to fold within the handle, springs acting upon the blades to hold them in folded or open position and adapted to permit relative movement thereof for a cutting action, and a connection between the blades adapting them to be simultaneously withdrawn by a pulling action upon one of the blades, said connection being designed to allow free relative movement of the blades in the cutting action.

3. Scissors comprising a handle, blades pivotally mounted to fold therein and to swing outwardly therefrom, said blades having a pin-and-groove connection for free movement one upon the other and to connect them so that they may be simultaneously opened by a pulling action upon one of the blades and springs for holding the blades in retracted position, and adapted to permit of their relative movement for a cutting action.

In testimony whereof I affix my signature in presence of two witnesses.

ALBERT T. EKLUND.

Witnesses:
 JOHN EKLUND,
 VICTOR EKLUND.